(12) United States Patent
Weber

(10) Patent No.: US 6,226,433 B1
(45) Date of Patent: May 1, 2001

(54) PLANAR OPTICAL WAVEGUIDE AND METHOD OF SPATIALLY SELECTIVELY INCREASING THE REFRACTIVE INDEX IN A GLASS

(75) Inventor: Dieter Weber, Kornwestheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/425,017

(22) Filed: Oct. 25, 1999

(30) Foreign Application Priority Data

Oct. 28, 1998 (DE) ............................................... 198 49 612

(51) Int. Cl.⁷ ....................................................... G02B 6/10
(52) U.S. Cl. ......................... 385/129; 385/130; 385/131; 385/141; 385/132; 65/385; 65/386
(58) Field of Search ..................................... 385/129, 130, 385/131, 132, 141; 65/385, 386

(56) References Cited

U.S. PATENT DOCUMENTS

| | | | |
|---|---|---|---|
| 5,196,041 | * | 3/1993 | Tumminelli et al. .................. 65/30.1 |
| 5,299,276 | | 3/1994 | Okamura et al. ..................... 385/130 |
| 5,495,548 | | 2/1996 | Bilodeau et al. ..................... 385/123 |
| 5,556,442 | * | 9/1996 | Kanamori et al. ..................... 65/17.4 |
| 5,800,860 | * | 9/1998 | Kilian et al. ....................... 427/163.2 |
| 5,930,437 | * | 7/1999 | Nakai et al. .......................... 385/129 |

FOREIGN PATENT DOCUMENTS

| | | | |
|---|---|---|---|
| 0 702 525 A1 | 3/1996 | (EP) | ................................. 385/129 X |
| 0 545 432 B1 | 7/1996 | (EP) | ................................. 385/129 X |
| 0 810 454 A1 | 12/1997 | (EP) | ................................. 385/128 X |

OTHER PUBLICATIONS

G.D Maxwell, "Photosensitivity & Rare–Earth Doping in Flame Hydrolysis Deposited Planar Silica Waveguides", Proceedings of the International Society for Optical Engineering (SPIE)m col. 2695, pp. 16–29.

S. Gujrathi, "Photosensitivity in Phosphorus–Doped Silica Glass Optical Waveguides", Appl. Phys, Lett 65 (4), Jul. 25, 1994.

* cited by examiner

*Primary Examiner*—Brian Healy
(74) *Attorney, Agent, or Firm*—Sughrue, Mion, Zinn, Macpeak & Seas, PLLC

(57) ABSTRACT

In a method for spatially selectively increasing the refractive index in a glass layer which has been produced by flame hydrolysis deposition of a hydrolytic glass initial product on a base and subsequent sintering of the glass initial product, no measures are taken to increase the photosensitivity. Instead, heat is supplied where the refractive index of the glass is to be increased. It has been shown that this results in a densification of the sintered glass accompanied by an increase in the refractive index. The chemical composition of the thus treated regions is the same as that of the untreated regions.

6 Claims, 3 Drawing Sheets

PLANAR OPTICAL WAVEGUIDE AND METHOD OF SPATIALLY SELECTIVELY INCREASING THE REFRACTIVE INDEX IN A GLASS

BACKGROUND OF THE INVENTION

The invention relates to a planar optical waveguide and to a method of spatially selectively increasing the refractive index in a glass.

Planar optical waveguides of the type defined are known from an article by G. D. Maxwell entitled "Photosensitivity & Rare-Earth Doping in Flame Hydrolysis Deposited Planar Silica Waveguides", Proceedings of the International Society for Optical Engineering (SPIE), Vol.2695, p. 16–29. It is a common feature of all the glass waveguides described therein that the photosensitivity of the glass used is increased by suitable measures. Photosensitivity refers to the property of a material to react to irradiation with light of a suitable wavelength by a change in its refractive index of greater or lesser duration. Utilizing this effect, regions having an increased refractive index compared to the adjoining regions are formed in the optical waveguides by locally limited irradiation with UV light. By appropriately arranging these regions, for example a Bragg grating can be formed in the planar optical waveguide. Bragg gratings play an important role in transmission devices based on the principle of optical wavelength multiplexing.

The silicate glass used to produce optical waveguides has an extremely low inherent photosensitivity. Therefore without special treatment only a very small change in the refractive index can be obtained when the glass is exposed to a UV laser. The above mentioned article by G. D. Maxwell specifies several measures whereby the photosensitivity can be increased.

One measure consists in exposing the glass to a reducing atmosphere during sintering. However this leads to increased optical losses in the sintered glass for the wavelengths normally used in optical transmission technology. In the case of another measure also used in optical fibres, the glass is exposed to a hydrogen atmosphere at high pressure. This process, which is also referred to as "hydrogen charging" extends over several days; moreover, although the photosensitivity thereby attainable is relatively high, it is not very durable. Therefore the change in refractive index inducible by means of the irradiation also is not durable, for which reason optical components produced in this way must be more frequently readjusted by repeated UW irradiation. In the case of another known measure known as "flame brushing" the glass is treated with a hot oxyhydrogen flame. An excess of hydrogen in the flame causes a reaction presumably comparable with that which occurs in the case of hydrogen charging. The relevant details are given for example in an article by S. Gujrathi entitled "Photosensitivity in Phosphorus-Doped Silica Glass and Optical Waveguides", Appl. Phys. Lett. 65 (4), Jul. 25, 1994. However, similarly as in the case of hydrogen charging, here too the increase in photosensitivity is not very durable.

SUMMARY OF THE INVENTION

Therefore the object of the invention is to provide a planar optical waveguide of the type defined which does not have the described disadvantages associated with measures for increasing photosensitivity.

The planar optical waveguide according to the invention comprises at least one glass layer which has been produced by flame hydrolysis deposition of a hydrolytic glass initial product on a base and subsequent sintering of the glass initial product, and which comprises at least one region in which (1) the refractive index is locally increased compared to regions of the glass layer adjoining this region and (2) has the same chemical composition as the adjoining region and has a higher density than the adjoining regions. The invention is based on the recognition that hydrolytic glass initial products can be redensified after sintering by supplying heat without any change occurring in the chemical composition. The regions with a greater density have a higher refractive index than the other regions; the attainable change in refractive index $\Delta n$ is in the order of $1.5 \cdot 10^{-3}$. As this effect is not based on the principle of photosensitivity, no chemical reaction takes place when heat is supplied. In particular however, the method according to the invention dispenses with the need to achieve noteworthy photosensitivity by one of the above explained known measures. Consequently a planar optical waveguide produced by the method according to the invention also does not possess the disadvantages associated with these measures, for example higher optical losses or poor durability of the change in refractive index.

The invention can be applied both to pure glass waveguides, in which all the layers consist of glass, and to optical waveguides in which not all the layers consist of glass. JP-A-04238305 has for example disclosed a planar optical waveguide in which a part of the top layer is formed by a polymer having thermo-optical properties. Here and in the following "layer" is also to be understood as an arrangement formed by structuring a planar, cohesive layer. Thus, the glass layer containing the regions with an increased refractive index can also consist of a structured core layer, and thus a light-conducting planar arrangement of cross-members of approximately rectangular cross-section.

The invention can be effectively utilized wherever a change in refractive index is to be selectively induced. In interferometric arrangements (Mach-Zehnder interferometers or so-called arrayed waveguide gratings (AWG)) for example the optical phase position is finely tuned by a local change in refractive index. Up until the present time such fine tuning has been achieved via UV irradiation (UV trimming).

The invention can be applied particularly advantageously to optical waveguides with an integrated Bragg grating. This is formed for example by causing the beam of an infrared laser to pass through a phase mask onto the optical waveguide. The refractive index profile in the waveguide then corresponds to the diffraction pattern produced by the phase mask. In contrast to known optical waveguides with an integrated Bragg grating, here the refractive index profile is durable so that no impairment of the reflective properties occurs with increasing age.

It has also been shown that the described densification effect does not occur if the glass initial product is not of a hydrolytic but an oxidic origin. If an oxidic glass initial product of this kind is sintered, the density of the glass which forms is such that the glass can no longer be redensified by thermal treatment. If a core layer produced from a hydrolytic glass initial product is surrounded by glass layers produced from an oxidic glass initial product, the change in refractive index produced by the thermal effect can thus be limited to the core region of the waveguide as it is only here that redensification takes place.

The invention further relates to a method of spatially selectively increasing the refractive index in a glass layer, in particular a glass layer in a planar, optical waveguide of the type described above. In accordance with one aspect of the invention, the heat is preferably supplied by means of a laser as its beam collimation ensures a high degree of spatial precision in the heat supply. Preferably a laser with a long-wave operating wavelength (infrared laser) is used, as the UV lasers employed in known methods result in only a small temperature increase in the glass.

In a further preferred embodiment, the core is defined not by structuring a core layer but by locally supplying heat. The core is thus "burned" into the core layer in a type of scribing process. This dispenses with the core-structuring process step.

BRIEF DESCRIPTION OF THE DRAWINGS

The following invention will be explained in detail in the form of the exemplary embodiments and making reference to the drawings in which.

DETAILED DESCRIPTION OF THE INVENTION

Figure 1:
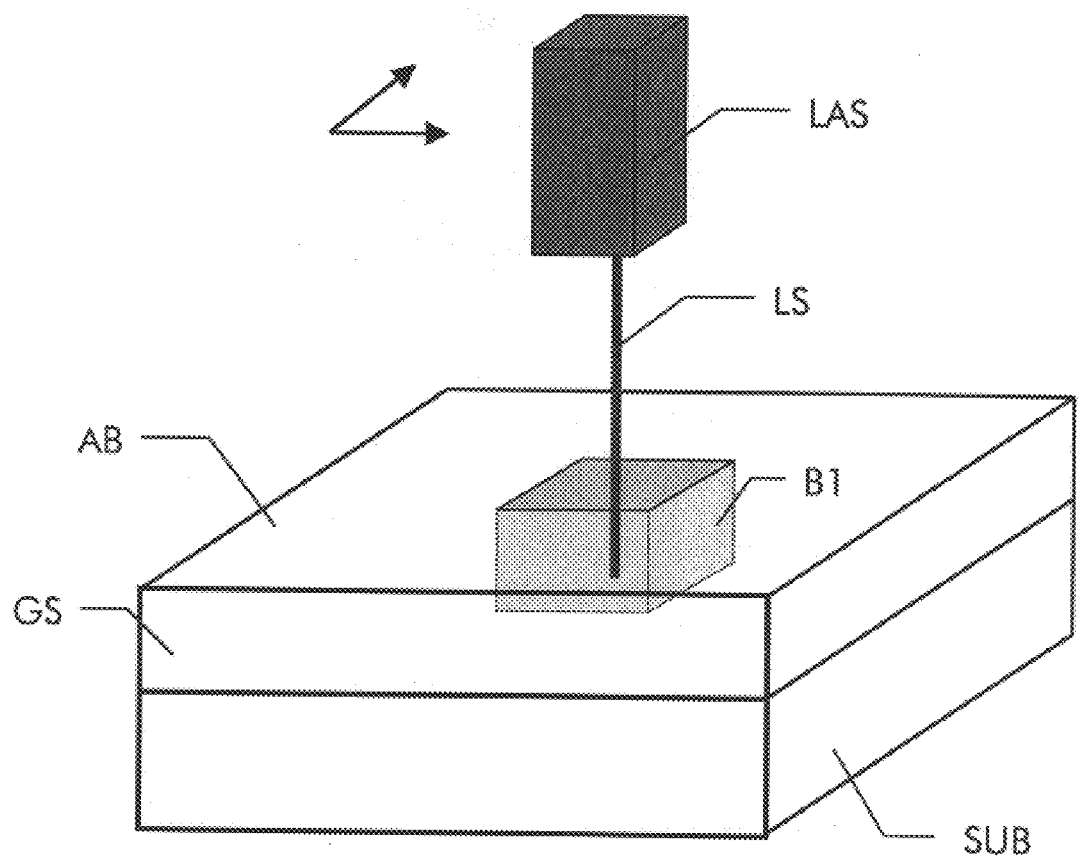
FIG. 1 is a three-dimensional diagram of a glass layer arranged on a carrier in explanation of a simple exemplary embodiment of the invention.

In explanation of the principle of the invention, FIG. 1 illustrates a carrier SUB on which a glass layer GS is arranged. The carrier can consist for example of a silicon crystal or a ceramic. The glass layer GS is produced in that firstly a glass initial product is deposited on the carrier by flame hydrolysis deposition (FHD). The gas mixture in the burner flame here is selected such that the deposited glass initial product (soot) has a hydrolytic character. This can be achieved by means of a hydrogen/oxygen ratio in the order of approximately 4:6.5 in the flame. Then the glass initial product, still in the form of a porous deposit, is sintered in a furnace to form a homogeneous glass. Details of this process can be gathered for example from EP-B1-0 545 432.

In accordance with the invention, heat is now supplied via a heat source in a region B1 in which the refractive index of the glass layer is to be increased. In FIG. 1 this heat source has the form of a laser LAS. The emission wavelength of the laser is to be in the long-wave range (infrared) as here the glass producible by flame hydrolysis deposition is normally particularly strongly absorbent. Currently available $CO_2$ lasers are particularly suitable. Less suitable are UV lasers, such as excimer lasers, as due to the comparatively low absorption only a small temperature increase in the glass is attainable. However, other heat sources, e.g. soldering lamps, can also be used in principle. The use of lasers has the advantage, however, that their beam collimation ensures a high degree of spatial precision in the heat supply.

In FIG. 1 the two arrows indicate that the laser LAS and the glass layer are moveable relative to one another. The beam LS produced by the laser LAS is guided such that it passes over the region B1 in which the refractive index is to be increased. Here the speed of the relative movement must be selected such that the region B1 is adequately heated. It has been shown that a refractive index increase An of approximately $1.5 \cdot 10^{-3}$ is attainable if the temperature in this region is increased to approximately 1300° C. for a short time (a few seconds to approximately 1 minute). The attainable change in density amounts to approximately 3%. No change occurs in the chemical composition in this region as no additives are introduced due to the heating. Therefore although the adjoining region AB and the region B1 have different densities, they possess the same chemical composition.

Instead of a highly accurately guided movement of the laser LAS relative to the glass layer GS, it is also possible to arrange a mask above the glass layer. It is then sufficient for the laser LAS to be guided relatively imprecisely across the mask. The accuracy with which the boundaries of the region B1 are definable now is no longer dependent upon the beam guidance but upon the accuracy of the mask.

Figure 2:
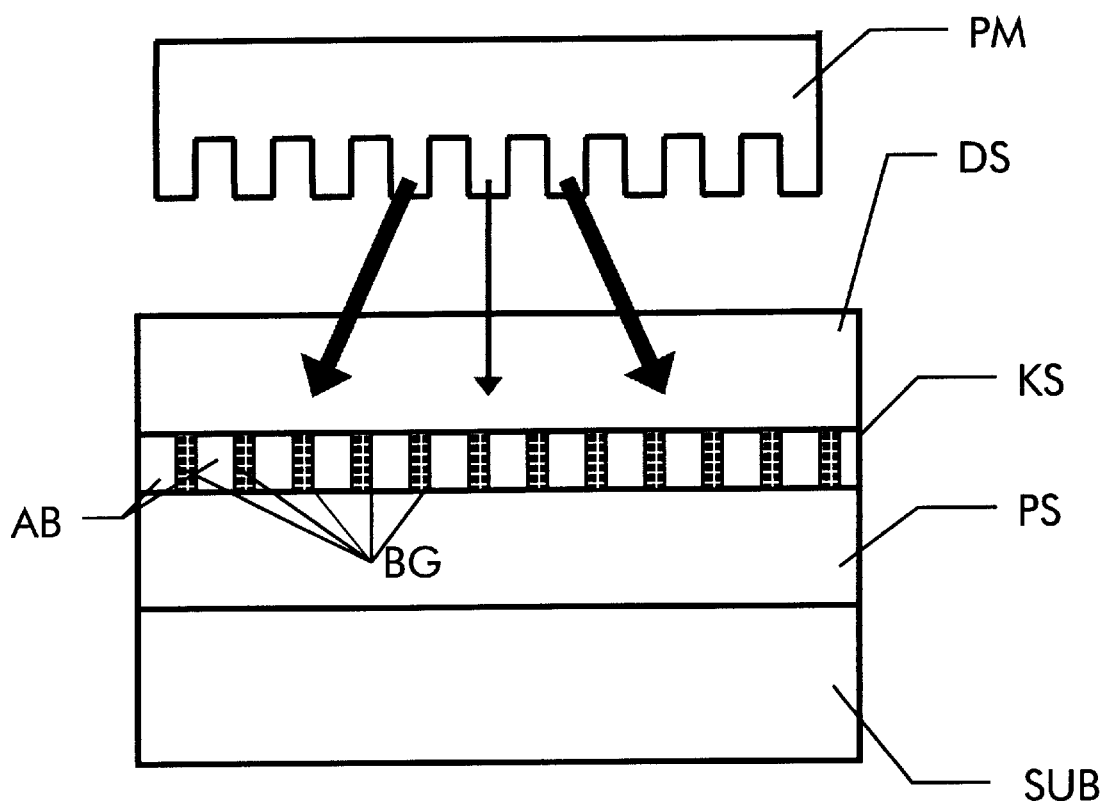
FIG. 2 is a section through a planar optical waveguide according to the invention upon which a Bragg grating is impressed.

FIG. 2 illustrates another exemplary embodiment of the invention. Shown here is a carrier SUB on which a planar optical waveguide is arranged. The glass layer containing at least one region with an increased refractive index here is the core layer KS of the planar optical waveguide. To facilitate wave guidance, the core layer KS is surrounded by a buffer layer PS on the substrate side and by a top layer DS on the other side. The core layer KS is doped with additives which increase the refractive index of the core layer. Due to the difference in refractive index of the boundary surfaces between the core layer KS and the surrounding layers PS and DS, light input-coupled into the core layer is totally reflected at these boundary surfaces and thus guided in the core layer. The core layer can have the form of a film waveguide or a strip waveguide. In the latter case the core layer must be structured, which will not be discussed in detail here as the associated processes will be familiar to the person skilled in the art.

In order to produce a Bragg grating in the optical waveguide, above the top layer DS there is arranged a phase mask PM which is illuminated from above by an infrared laser (not shown). The diffraction grating in the phase mask produces a diffraction pattern on the side facing towards the optical waveguide. An increase in temperature occurs at the nodes of the diffraction pattern, leading to a local densification of the glass and thus to an increase in the refractive index. In this way a Bragg grating BG having a very high reflectivity for the Bragg wavelength can be produced in the optical waveguide. In contrast to known methods, in which a UV laser is directed via a phase mask onto photo-sensitive glass, the reflectivity does not diminish over the course of time.

To limit the change in refractive index to the core layer KS, the surrounding glass layers PS and DS can be produced somewhat differently to the core layer KS. As mentioned above the glass initial product, from which the later core layer is formed by sintering, has a hydrolytic character. Upon the deposition of the initial product, the following reactions typically occur:

$O_2 + 2\ H_2 \rightarrow 2\ H_2O + \text{heat}$ $SiCl_4 + 4\ H_2O \rightarrow Si(OH)_4\ \text{(glass initial product)} + 4\ HCl$ If, on the other hand, the ratio of hydrogen to oxygen in the flame is selected as approximately 1:1, the following reactions predominate:

$O_2 + 2\ H_2 \rightarrow 2\ H_2O + \text{heat}$ $SiCl_4 + O_2 \rightarrow SiO_2\ \text{(glass initial product)} + 2\ Cl_2$ The glass initial product now has an oxidic character. After sintering, the density of an oxidic glass initial product of this type is already so high that it cannot be redensified by supplying heat. If the buffer layer PS and the top layer DS are produced by the method described in the foregoing, it can be obtained that heat acting simultaneously on all three layers PS, KS and DS leads to an increase in the refractive index only in the core layer.

Figure 3:
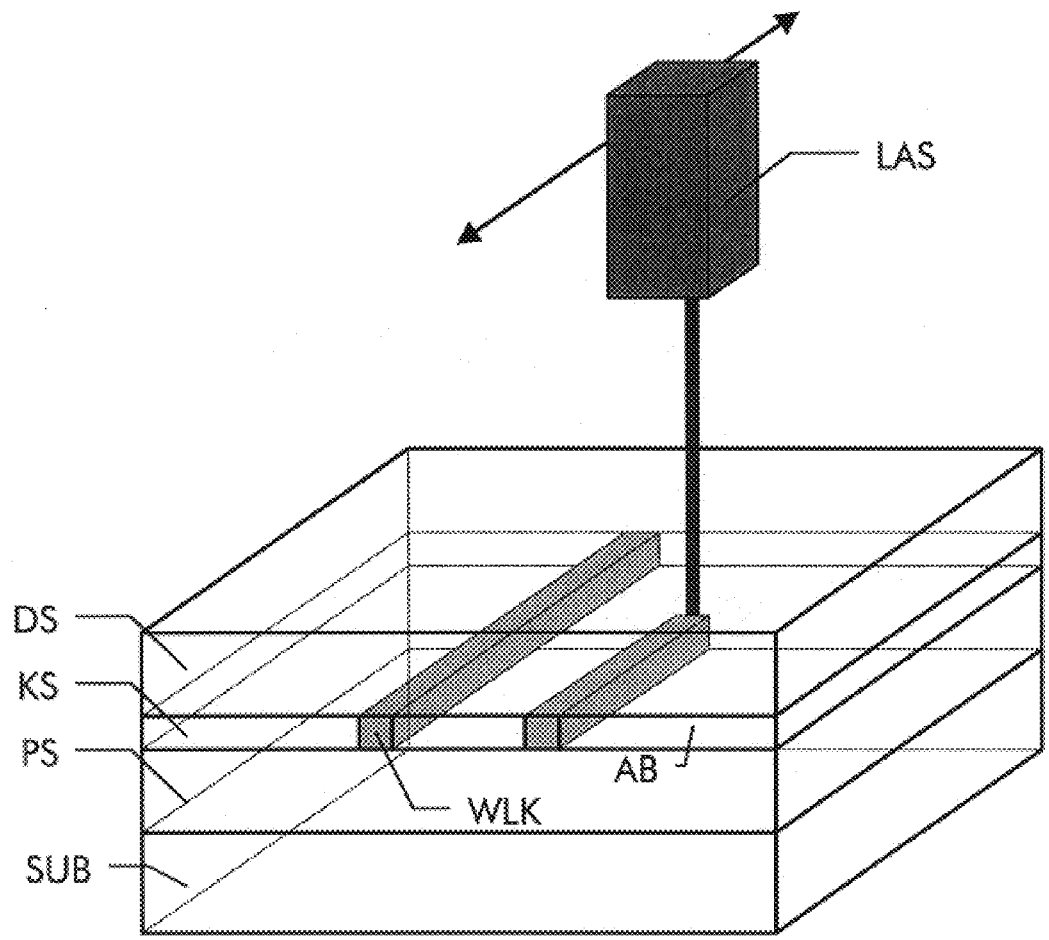
FIG. 3 is a three-dimensional diagram of a planar optical waveguide structure which is arranged on a carrier and the core layer of which is structured by supplying heat.

This effect can also be utilized to "write" waveguide cores into an unstructured core layer. FIG. 3 illustrates an optical waveguide structure arranged on a carrier SUB in a three-dimensional diagram. The structure comprises a top layer DS, an unstructured core layer KS and a buffer layer PS. The core layer KS is produced from a hydrolytic glass initial product while the buffer layer PS and the top layer DS are produced from an oxidic glass initial product. If heat is now supplied from above, for example by means of a laser LAS, although a temperature increase occurs in all the layers, densification occurs only in the core layer KS as the two other layers originate from an oxidic glass initial product and therefore are no longer redensifiable. In this way a waveguide core WLK can be written into the core layer for example by moving the laser LAS in a precise manner across the surface of the top layer DS. Therefore the region in which the refractive index is locally increased compared to regions adjoining this region here is the waveguide core WLK.

What is claimed is:

1. A planar optical waveguide, comprising:
   at least one glass layer which has been produced by flame hydrolysis deposition of a hydrolitic glass initial product on a base and subsequent sintering of the glass initial product; and
   at least one region in which a refractive index is locally increased compared to regions of the glass layer adjoining this region,
   wherein the at least one region has a same chemical composition as the adjoining regions,
   wherein the at least one region has a higher density than the adjoining regions, and
   wherein the glass layer is a structured core layer of the optical waveguide.

2. A planar optical waveguide according to claim 1,
   wherein a plurality of regions in which the refractive index is locally increased compared to regions adjoining those regions form a refractive index grating.

3. A planar optical waveguide according to claim 1,
   wherein the core layer is arranged between two further glass layers and these two further glass layers have a higher density than the regions adjoining the at least one region.

4. A method of spatially selectively increasing a refractive index in a glass layer which has been produced by flame hydrolysis deposition of a hydrolytic glass initial product on a base, and subsequent sintering of the glass initial product,
   wherein no measures are taken to increase a photosensitivity, and heat is supplied where the refractive index of the glass is to be increased, and
   wherein the heat is supplied using an infrared laser.

5. A method of spatially selectively increasing a refractive index in a glass layer which has been reduced by flame hydrolysis deposition of a hydrolic glass initial product on a base, and subsequent sintering of the glass initial product,
   wherein no measures are taken to increase a photosensitivity, and heat is supplied where the refractive index of the glass is to be increased, and
   wherein the glass is a core layer of a planar optical waveguide which is arranged between two further glass layers, and
   wherein the two further glass layers are produced by deposition of an oxidic glass initial product and subsequent sintering of the glass initial product.

6. A method according to claim 4, wherein the glass forms a core layer of a planar optical waveguide, the structure of the core layer being defined by locally supplying heat.

* * * * *